United States Patent
Lampley et al.

(10) Patent No.: US 10,802,496 B2
(45) Date of Patent: Oct. 13, 2020

(54) REMOTE TRACTOR CONTROL SYSTEM

(71) Applicant: Deere & Company, Moline, IL (US)

(72) Inventors: Clint W. Lampley, Grovetown, GA (US); Harry K. Voelp, IV, Evans, GA (US); Christopher T. McCord, Thomson, GA (US); Chris S. McCormick, Evans, GA (US)

(73) Assignee: Deere & Company, Moline, IL (US)

( * ) Notice: Subject to any disclaimer, the term of this patent is extended or adjusted under 35 U.S.C. 154(b) by 126 days.

(21) Appl. No.: 16/114,653

(22) Filed: Aug. 28, 2018

(65) Prior Publication Data

US 2020/0073397 A1 Mar. 5, 2020

(51) Int. Cl.
*G05D 1/02* (2020.01)
*A01B 69/00* (2006.01)
*G08C 17/02* (2006.01)

(52) U.S. Cl.
CPC ......... *G05D 1/0223* (2013.01); *A01B 69/007* (2013.01); *G08C 17/02* (2013.01); *F16H 2312/06* (2013.01)

(58) Field of Classification Search
CPC . B66F 9/07581; G05D 1/0011; G05D 1/0016; G05D 1/0223; B60W 2050/0064; A01B 69/00; A01B 76/00; A01B 69/003; A01B 69/005; A01B 69/007; A01B 59/066; F16H 2312/06; G08C 17/02; B62D 1/00
See application file for complete search history.

(56) References Cited

U.S. PATENT DOCUMENTS

| | | | | |
|---|---|---|---|---|
| 4,715,012 A | | 12/1987 | Mueller, Jr. | |
| 4,817,499 A | * | 4/1989 | Bellanger | A01B 63/1117 172/2 |
| 4,869,337 A | * | 9/1989 | Wagner | B60N 2/143 180/330 |
| 5,190,118 A | * | 3/1993 | Yelton | B60K 6/00 180/321 |
| 5,205,181 A | * | 4/1993 | Wright | E02F 9/2004 180/323 |
| 5,421,416 A | * | 6/1995 | Orbach | A01B 63/1117 172/3 |
| 5,592,029 A | | 1/1997 | Hollstein et al. | |
| 6,112,139 A | | 8/2000 | Schubert et al. | |
| 6,134,494 A | | 10/2000 | Stelzle et al. | |
| 6,205,385 B1 | | 3/2001 | Stelzle et al. | |
| 6,851,495 B2 | | 2/2005 | Sprinkle et al. | |

(Continued)

FOREIGN PATENT DOCUMENTS

JP   H07184406 A   7/1995

OTHER PUBLICATIONS

European Search Report issued in counterpart European Patent Application No. 19188837.9 dated Mar. 10, 2020 (7 pages).

*Primary Examiner* — Laura Freedman

(57) ABSTRACT

A remote tractor control system with a hand held remote control unit having an enable button that when actuated sends signals from a plurality of command buttons on the hand held remote control unit to a three point hitch controller, a transmission controller and an engine controller on a tractor. When not actuated, a rear switch module may be used to raise and lower the three point hitch or creep in forward or reverse, while the hand held remote control unit may display information about tractor condition from the engine controller.

9 Claims, 2 Drawing Sheets

(56) References Cited

U.S. PATENT DOCUMENTS

| | | | |
|---|---|---|---|
| 7,280,898 B2* | 10/2007 | Lesesky | G07C 5/008 |
| | | | 701/31.5 |
| 7,721,840 B2* | 5/2010 | McCord | B62D 1/12 |
| | | | 180/321 |
| 8,185,276 B2* | 5/2012 | Buckbee | E01C 19/20 |
| | | | 37/196 |
| 8,272,467 B1* | 9/2012 | Staab | E02F 9/26 |
| | | | 172/2 |
| 8,322,482 B2 | 12/2012 | Sprinkle et al. | |
| 9,050,890 B2* | 6/2015 | Buerkle | B60K 26/00 |
| 9,213,331 B2* | 12/2015 | Johnson | E02F 9/205 |
| 9,346,394 B1* | 5/2016 | Orazem | B60Q 1/0088 |
| 9,981,597 B2* | 5/2018 | Orazem | B60Q 1/2661 |

* cited by examiner

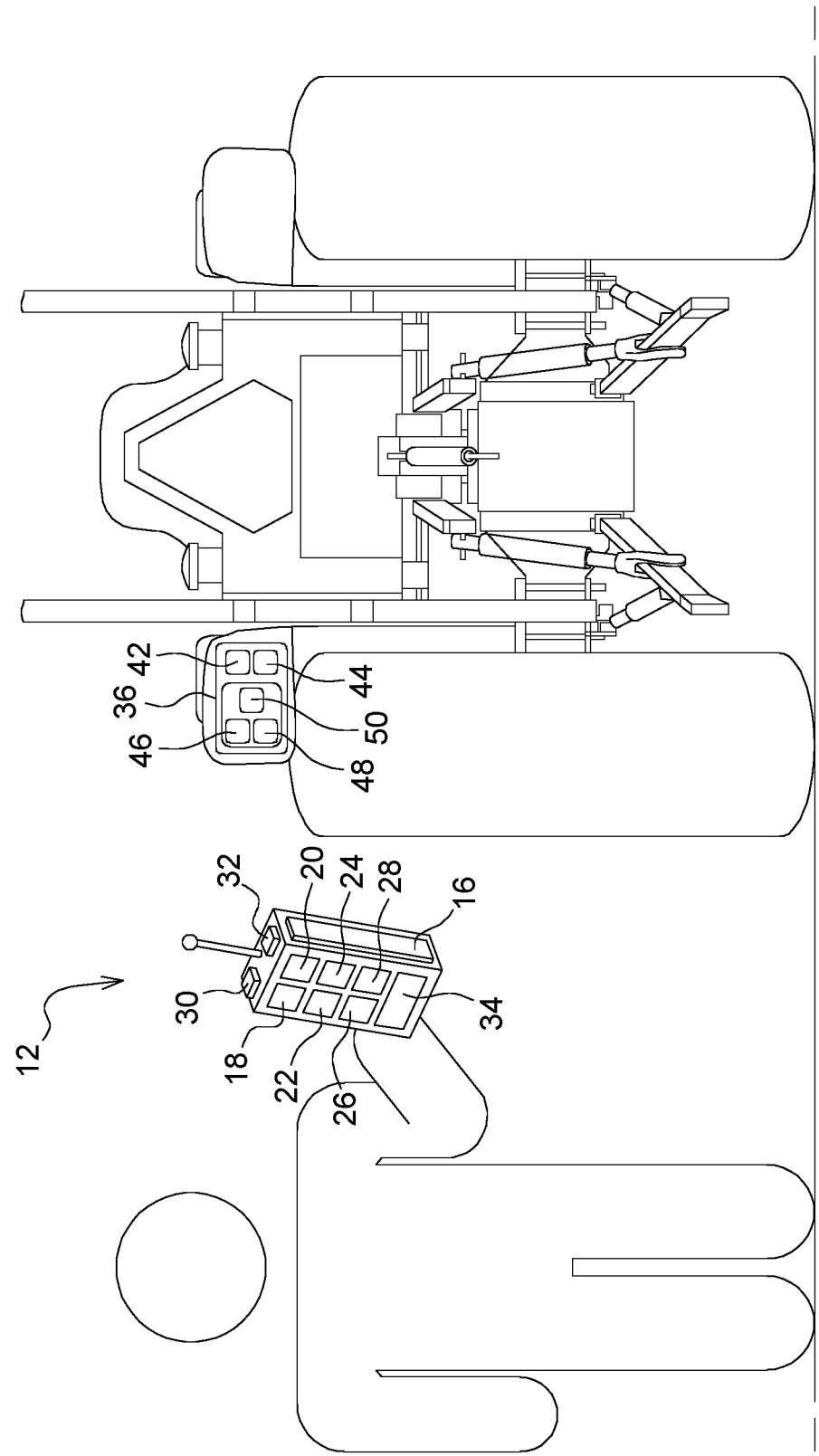

REMOTE TRACTOR CONTROL SYSTEM

FIELD OF THE INVENTION

This invention relates generally to a remote tractor control system that an operator may use while off the tractor or seated facing rearwardly to control a three point hitch, creep, engine speed or other tractor functions.

BACKGROUND OF THE INVENTION

In the past, some tractors have included controls electrical or electro-hydraulic controls for a three point hitch located on a tractor's right or left rear fenders. These control devices make it more convenient for the operator to hook up rear mounted implements while off the tractor. For example, one switch may supply a signal to a valve or valves to raise the hitch, and the other switch may supply a signal to lower the hitch. Even with the controls mounted on the fender, however, changing rear mounted implements on a three point hitch can be labor intensive because of the difficulty and time required to accurately position the tractor with respect to the implement.

U.S. Pat. No. 8,322,482 for a Tractor Ground Positioning System assigned to Deere & Company of Moline, Ill. describes a tractor ground positioning system that includes controls on the rear fender that may be used to move the tractor slowly in forward or reverse for short distances when attaching an implement. The operator may actuate the ground positioning controls while standing on the ground next to the tractor, and must remain in direct contact with the controls on the rear fender.

U.S. Pat. No. 6,851,495 for a Speed Control System for Utility Vehicle Operable From Rearward-Facing Seat assigned to Deere & Company describes a creep speed control for operating a utility vehicle while seated in a rearward facing position and operating rear mounted implements, such as a backhoe attachment. The creep speed control includes a mechanical or electronic control arrangement that allows the operator to "creep" forward or rearward at a controlled speed while operating the rear mounted implement.

There is a need for a remote tractor control system having controls to attach a rear mounted implement that an operator may safely use while off the tractor instead of controls mounted on the rear fender, to raise and lower the three point hitch or move the tractor slowly in forward or reverse. There is a need for a remote tractor control system having controls for additional functions that an operator may safely use while off the tractor. There is a need for a remote tractor control system that allows an operator to control certain tractor functions from a rear facing seat while operating a backhoe, such as increasing or decreasing engine speed, raising or lowering a front bucket, creeping the tractor in forward or reverse. There is a need for a remote tractor control system that allows an operator to receive information about the tractor condition while off the tractor or in a rear facing seat.

SUMMARY OF THE INVENTION

A remote tractor control system includes a hand held remote control unit having a plurality of command buttons including buttons for raising or lowering a three point hitch on a tractor and creeping the tractor in forward or reverse, and an enable button that must be actuated to wirelessly transmit signals from each of the plurality of command buttons to a remote receiver module on the tractor. The system also includes a rear switch module on the tractor having buttons for raising or lowering the three point hitch and creeping in forward or reverse. The remote receiver module disables the rear switch module when the enable button on the hand held remote control unit is actuated.

BRIEF DESCRIPTION OF THE DRAWINGS

FIG. 2 is an end view of a hand held remote control unit and a rear switch module on a tractor according to a first embodiment of the invention.

DESCRIPTION OF THE PREFERRED EMBODIMENT

Figure 1:
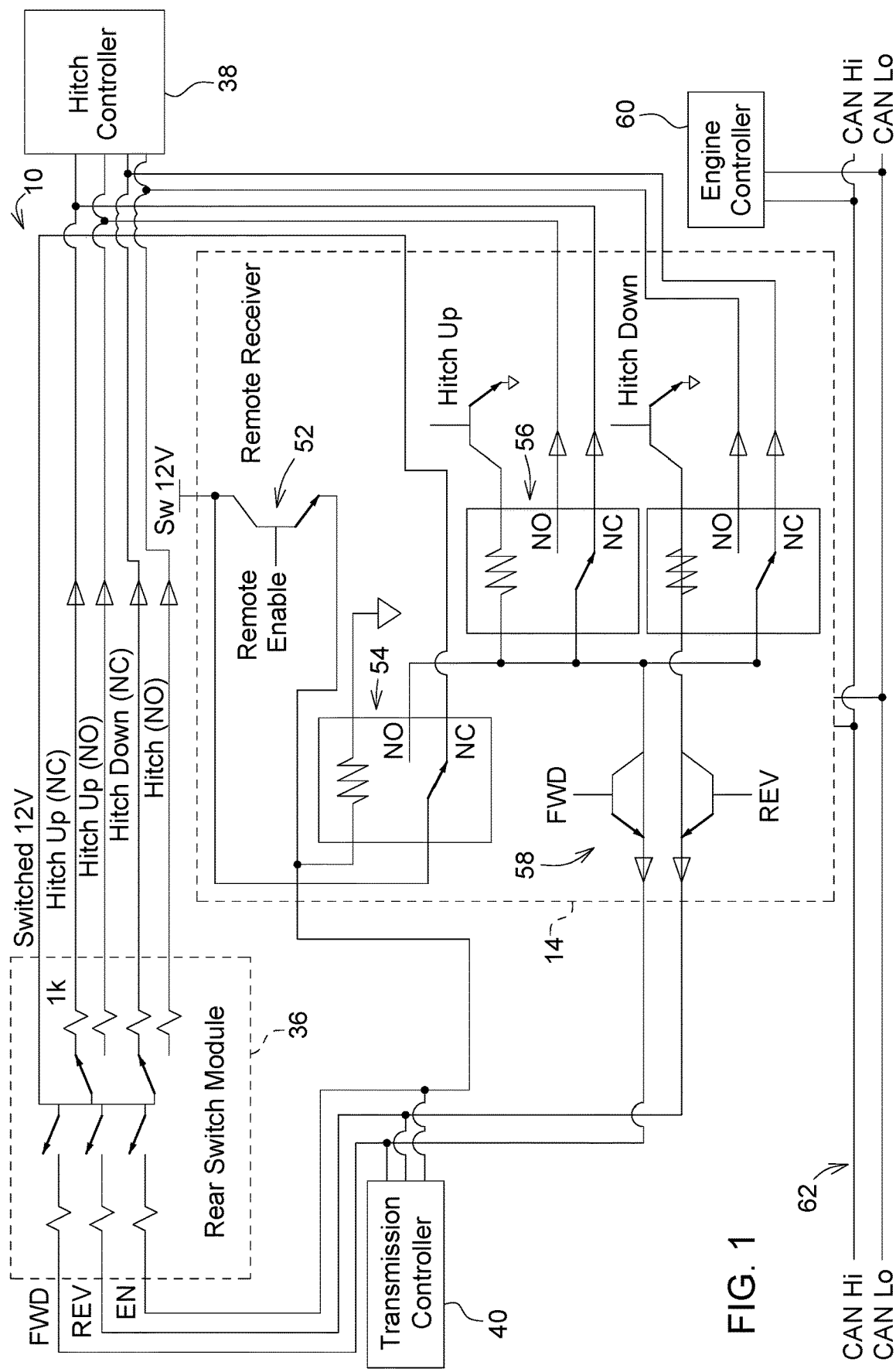
FIG. 1 is a schematic diagram of a remote tractor control assist system according to a first embodiment of the invention.

In one embodiment shown in FIGS. 1-2, remote tractor control system 10 may include hand held remote control unit 12 that an operator may use to provide wireless signals or commands while the operator is off the tractor, preferably at distances up to about 30 feet from the tractor, or while seated on the tractor facing rearwardly. The hand held remote control unit may transmit by short range radio or Bluetooth to remote receiver module 14 on the tractor.

In one embodiment, remote tractor control system 10 may include hand held remote control unit 12 having remote enable button 16 and command buttons 18-32 for functions such as attaching an implement that may be done while off the tractor or seated facing rearwardly. The remote enable button may function as a momentary safety switch to enable sending commands from the hand held remote control unit to the remote receiver module. The operator must hold the remote enable button at the same time as one of the command buttons. When the operator is not holding the remote enable button, the hand held remote control unit does not send commands to the remote receiver module. Instead, the hand held remote control unit may activate display 34 which may show information about tractor condition from the engine controller such as engine speed, oil pressure, water temperature, or hydraulic fluid temperature, which may be transmitted by remote receiver module 14 on the tractor to the hand held remote control unit.

In one embodiment, remote tractor control system 10 may include hand held remote control unit 12 having command buttons 18-20 to creep in forward or reverse, command buttons 22-24 to raise or lower the three point hitch, command buttons 30-32 to start or stop the engine, and command buttons 26-28 that may be configurable for various other tractor functions that may be desirable and safe while the operator is off the tractor or seated facing rearwardly and operating rear facing implements such as a backhoe. For example, command buttons 26-28 may be configured to increase or decrease engine speed, raise or lower a front implement, tilt a bucket up or down, or turn the front wheels left or right.

In one embodiment, remote tractor control system 10 may include rear switch module 36 mounted on the rear of the tractor, preferably on the rear fender where the operator may use it while off the tractor. The operator may use the rear switch module to provide three point hitch and creep commands to hitch controller 38 and transmission controller 40 unless the enable signal from hand held remote control unit 12 is received through remote receiver module 14. The rear switch module may include buttons 42-44 that may provide commands to the hitch controller to raise or lower the three point hitch, and buttons 46-48 that may provide commands to the transmission controller to creep in forward and reverse. The rear switch module also may include rear switch enable button 50 which the operator must hold in order to operate the command buttons on the rear switch module. The tractor also may include controls in the operator station adjacent a forward facing seat for raising and lowering the three point hitch, and controls in the operator station adjacent the forward facing seat for operating the transmission in creep mode, forward or reverse.

In one embodiment, remote tractor control system 10 may include remote receiver module 14 mounted on the tractor. The remote receiver module may include switch 52 and relay 54 to shut off 12V power to rear fender switch module 36 when the remote receiver module receives a remote enable signal from hand held remoter control unit 12. The remote receiver module may use 12V power only to power the remote enable, and the other switches on the remote receiver module may be powered off of relay 54. The other switches may include three point hitch raise and lower switches 56, and creep forward and reverse switches 58. The three point hitch raise and lower switches, and the creep forward and reverse switches, may be actuated by commands that the remote receiver module receives from the hand held remote control unit when it is enabled. The three point hitch raise and lower switches may connect to hitch controller 38, and the creep forward and reverse switches may connect to transmission controller 40. Additionally, the remote receiver module may send commands received from the hand held remote control unit to engine controller 60, and send engine data from the engine controller to the had held remote control unit. For example, the remote receiver module may be connected to the engine controller via CAN bus 62.

Having described the preferred embodiments, it will become apparent that various modifications can be made without departing from the scope of the invention as defined in the accompanying claims.

The invention claimed is:

1. A remote tractor control system, comprising:
a hand held remote control unit having a plurality of command buttons including buttons for raising or lowering a three point hitch on a tractor and creeping the tractor in forward or reverse, and an enable button that must be actuated to wirelessly transmit signals from each of the plurality of command buttons to a remote receiver module on the tractor;
a rear switch module on the tractor also having buttons for raising or lowering the three point hitch and creeping in forward or reverse; the remote receiver module disabling the rear switch module when the enable button on the hand held remote control unit is actuated; and
a display on the hand held remote control unit that shows information from an engine controller when the enable button is not actuated.

2. The remote tractor control system of claim 1 wherein the hand held remote control unit includes buttons for operating a rear facing implement.

3. The remote tractor control system of claim 1 further comprising an enable switch on the rear switch module.

4. A remote tractor control system, comprising:
a three point hitch on a tractor that may be raised or lowered by actuating a control in an operator station on the tractor, a button on a rear fender, or a hand held remote control unit off the tractor;
a transmission on the tractor that may creep the tractor in forward or reverse by actuating a control in the operator station on the tractor, a button on the rear fender, or the hand held remote control unit off of the tractor; and
a remote receiver module on the tractor that allows the hand held remote control unit to actuate the three point hitch and the creep only if the hand held remote control unit transmits an enable signal; and
a display on the hand held remote control unit that is activated when the hand held remote control unit is not transmitting the enable signal, the display showing information from an engine controller which is transmitted by the remote receiver module to the hand held remote control unit.

5. The remote tractor control system of claim 4, wherein the engine controller on the tractor starts or stops an engine by actuating a control in the operator station on the tractor, or the hand held remote control unit off of the tractor.

6. The remote tractor control system of claim 4, wherein the engine controller on the tractor increases or decreases engine speed by actuating a control in the operator station on the tractor, or the hand held remote control unit off of the tractor.

7. A remote tractor control system, comprising:
a hand held remote control unit having an enable button that when actuated sends signals from a plurality of command buttons on the hand held remote control unit to a three point hitch controller, a transmission controller and an engine controller on a tractor, and when not actuated displays information about tractor condition from the engine controller.

8. The remote tractor control system of claim 7, wherein the plurality of command buttons on the hand held remote control unit includes buttons for operating rear facing implements.

9. The remote tractor control system of claim 7, wherein the enable button on the hand held remote control unit disables a switch on a rear fender of the tractor.

* * * * *